(12) United States Patent
Tsai et al.

(10) Patent No.: US 10,977,775 B2
(45) Date of Patent: Apr. 13, 2021

(54) DEPTH DECODING SYSTEM AND METHOD FOR GROUND TRUTH IMAGE RECTIFICATION

(71) Applicant: HIMAX TECHNOLOGIES LIMITED, Tainan (TW)

(72) Inventors: Chin-Jung Tsai, Tainan (TW);
Yu-Hsuan Chu, Tainan (TW);
Cheng-Hung Chi, Tainan (TW);
Ming-Shu Hsiao, Tainan (TW);
Nai-Ting Chang, Tainan (TW);
Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 31 days.

(21) Appl. No.: 16/504,308

(22) Filed: Jul. 7, 2019

(65) Prior Publication Data
US 2020/0184611 A1 Jun. 11, 2020

Related U.S. Application Data

(60) Provisional application No. 62/776,474, filed on Dec. 7, 2018.

(51) Int. Cl.
*G06T 5/00* (2006.01)
*G06T 7/521* (2017.01)
(Continued)

(52) U.S. Cl.
CPC .............. *G06T 5/006* (2013.01); *G06T 5/50* (2013.01); *G06T 7/30* (2017.01); *G06T 7/521* (2017.01);
(Continued)

(58) Field of Classification Search
CPC .......... G06T 5/006; G06T 7/521; G06T 7/55; G06T 5/50; G06T 7/30;
(Continued)

(56) References Cited

U.S. PATENT DOCUMENTS

| 6,101,455 | A | * | 8/2000 | Davis | B25J 9/1697 |
|---|---|---|---|---|---|
| | | | | | 382/153 |
| 2002/0097962 | A1 | * | 7/2002 | Yoshimura | H01L 23/48 |
| | | | | | 385/50 |

(Continued)

FOREIGN PATENT DOCUMENTS

| CN | 104408732 | 3/2015 |
|---|---|---|
| CN | 106990660 | 7/2017 |
| TW | 201832547 | 9/2018 |

OTHER PUBLICATIONS

"Office Action of Taiwan Counterpart Application", dated Nov. 10, 2020, p1-p7.

*Primary Examiner* — Joseph Suh
(74) *Attorney, Agent, or Firm* — JCIPRNET

(57) ABSTRACT

A depth decoding system and a method for rectifying a ground-truth image are introduced. The depth decoder system includes a projector, a camera, a processor and a decoder. The projector is configured to project a structural light pattern to a first reference plane and a second reference plane. The camera is configured to capture a first ground-truth image from the first reference plane and capture a second ground-truth image from the second reference plane. The processor is configured to perform a rectification operation to the first ground-truth image and the second ground-truth image to generate a rectified ground-truth image. The decoder is configured to generate a depth result according to the rectified ground-truth image.

11 Claims, 7 Drawing Sheets

(51) Int. Cl.
*G06T 7/55* (2017.01)
*G06T 5/50* (2006.01)
*G06T 7/30* (2017.01)

(52) U.S. Cl.
CPC ...... *G06T 7/55* (2017.01); *G06T 2207/10028* (2013.01); *G06T 2207/20221* (2013.01)

(58) Field of Classification Search
CPC .......... G06T 2207/10028; G06T 2207/20221; H04N 5/232; H04N 9/3141; H04N 5/217; G01C 11/00
See application file for complete search history.

(56) References Cited

U.S. PATENT DOCUMENTS

| | | | |
|---|---|---|---|
| 2006/0020213 A1* | 1/2006 | Whitman | A61B 1/05 600/478 |
| 2009/0065695 A1* | 3/2009 | DeMarco | G01J 5/025 250/330 |
| 2009/0316965 A1* | 12/2009 | Mailling | A43D 1/025 382/128 |
| 2012/0327430 A1 | 12/2012 | Lee et al. | |
| 2016/0050401 A1* | 2/2016 | Gordon | G01B 11/2513 348/744 |
| 2017/0099473 A1* | 4/2017 | Nakaguchi | G03B 21/14 |
| 2019/0278091 A1* | 9/2019 | Smits | H04N 13/363 |
| 2019/0295269 A1* | 9/2019 | Bleyer | G01B 11/2545 |

* cited by examiner

DEPTH DECODING SYSTEM AND METHOD FOR GROUND TRUTH IMAGE RECTIFICATION

CROSS-REFERENCE TO RELATED APPLICATION

This application claims the priority benefit of U.S. provisional application Ser. No. 62/776,474, filed on Dec. 7, 2018. The entirety of the above-mentioned patent application is hereby incorporated by reference herein and made a part of this specification.

BACKGROUND

Technical Field

The disclosure generally relates to depth decoding, and more particularly relates a system and a method for rectifying a ground-truth image that is capable of reducing distortions caused by alignment tolerance of components in the system.

Description of Related Art

A depth decoding system has been applied in a wide range of applications such as manufacturing inspection, robot vision, geographic measurement, gamming, multi-media application. In the depth decoding system, a projector and a camera are usually used to generate a depth map of objects in captured scenes. However, an alignment tolerance of the components such as the camera and the projector in the depth decoding system may cause distortions in the captured images. As a result, a performance of the depth decoding system is reduced.

As demands for better performance for the depth decoding system has grown recently, there has grown a need for a more creative technique to efficiently reduce distortions to the captured image.

Nothing herein should be construed as an admission of knowledge in the prior art of any portion of the present disclosure.

SUMMARY

A system and a method that are capable of rectifying a ground-truth image, thereby reducing the distortions are introduced.

In an embodiment of the disclosure, the method includes steps of projecting a structural light pattern to a first reference plane and a second reference plane; capturing a first ground-truth image from the first reference plane and capturing a second ground-truth image from the second reference plane; and performing a rectification operation to the first ground-truth image and the second ground-truth image to generate a rectified ground-truth image, wherein the rectified ground-truth image is used to generate a depth result.

In an embodiment of the disclosure, the system includes a projector, a camera, a processor and a decoder. The projector is configured to project a structural light pattern to a first reference plane and a second reference plane. The camera is configured to capture a first ground-truth image from the first reference plane and capture a second ground-truth image from the second reference plane. The processor is configured to perform a rectification operation to the first ground-truth image and the second ground-truth image to generate a rectified ground-truth image. The decoder is configured to generate a depth result according to the rectified ground-truth image.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
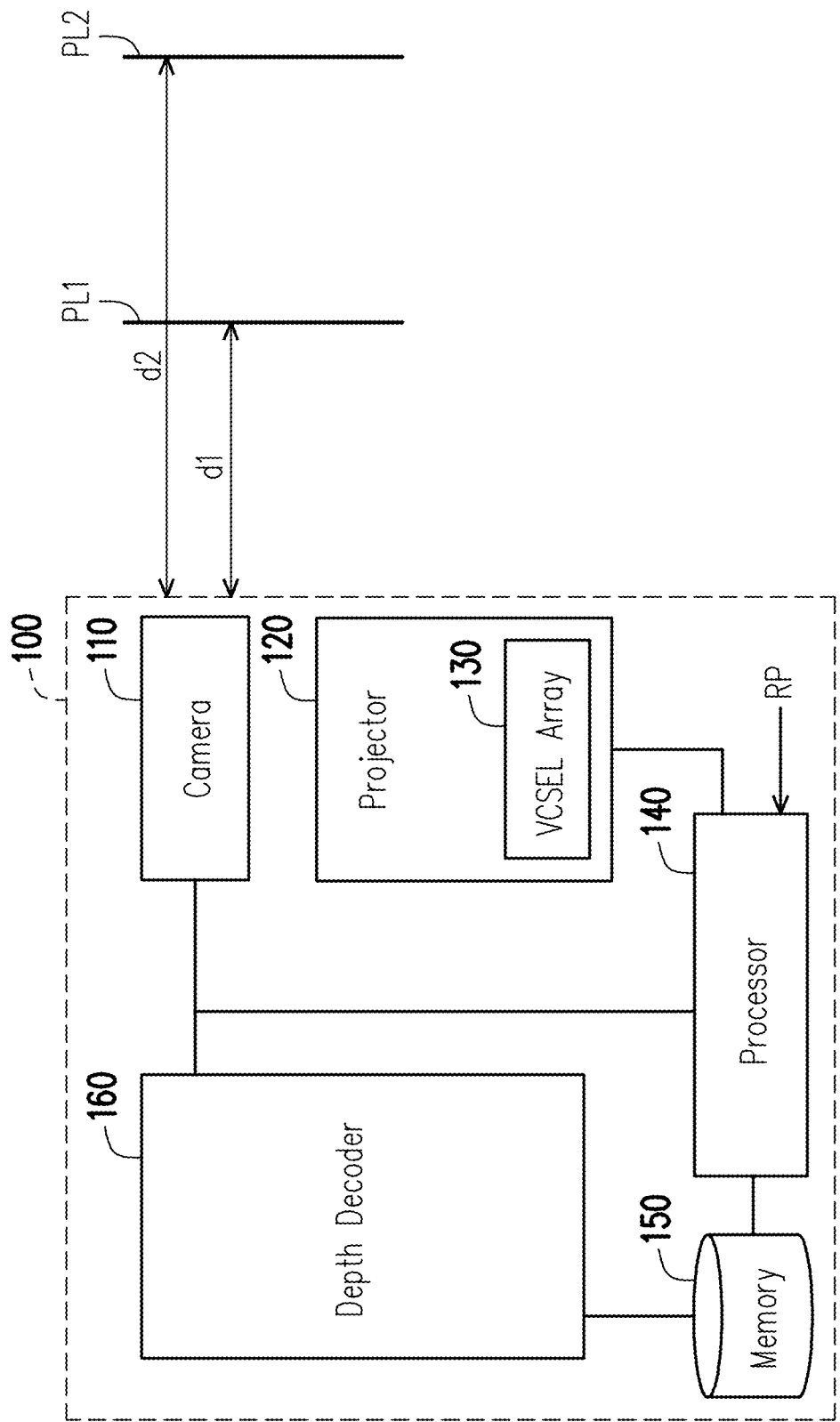
FIG. 1 is a schematic diagram illustrating a depth decoding system with reference planes in accordance with an embodiment of the disclosure.

Referring to FIG. 1, a depth decoding system 100 with reference planes PL1 and PL2 in accordance with some embodiments are illustrated. The depth decoding system 100 may include a camera 110, a projector 120, a processor 140, a memory 150 and a depth decoder 160. The projector 120 may include a light source formed of a vertical-cavity surface-emitting laser (VCSEL) array 130 that may generate and provide light for illuminating a projectable region of the projector 120. The projectable region of the projector 120 may cover the references planes PL1 and PL2. In some embodiments, the projector 120 may further include diffractive optical elements (DOE) that are configured for patterning the light generated by the VCSEL array 130. In other words, the projector 120 may generate and project a structural light pattern formed by the VCSEL array 130 and the DOE to the reference planes PL1 and PL2.

The camera 110 is configured to capture scenes in a viewable region of the camera 110, in which the viewable region of the camera 110 may partially or fully overlaps the projectable region of the projector 120. In some embodiments, the camera 110 may capture a first ground-truth image from the reference plane PL1 and a second ground-truth image from the reference plane PL2 in temporal. In some embodiments of the disclosure, the camera 110 may be a near-infrared camera that is configured to capture near-infrared wavelength radiation (or light) in the viewable region. Alternatively, the camera 110 may be an infrared camera, or a depth camera or a RGB camera or any other type of camera. The camera 110 and the projector 120 are placed separated from each; and there is a baseline that align the camera 110 and the projector 120. A length of the baseline between the camera 110 and the projector 120 may define a distance between the camera and the projector 120.

The processor 140 is coupled to the camera 110 and the projector 120, and is configured to control operations of the camera 110 and the projector 120. The processor 140 is further configured to receive ground-truth images captured by the camera 110 and rectify received ground-truth images according to at least one parameters RP to generate a rectified ground-truth image. The processor 140 may store the rectified ground-truth image to the memory 150.

The depth decoder 160 is coupled to the memory 150 and is configured to receive the rectified ground-truth image stored in the memory 150 and perform a decoding operation to generate a depth result according to the received rectified ground-truth image and a pattern image captured by the camera 110. In some embodiments, the depth decoder 160 may receive the input image captured by camera 110 during a decoding operation and perform a matching operation to the input image and the rectified ground-truth image to generate a depth result. The depth result may indicate the depth information of objects appeared in the captured input image.

The reference planes PL1 and PL2 are placed at locations such that a distance between the depth decoding system 100 and the reference PL1 is d1 and a distance between the depth decoding system 100 and the reference PL2 is d2. The distances d1 and d2 could be determined according to parameters of the depth decoding system 100. In some embodiments, the distances d1 and d2 could be determined according to a placement relationship between the camera 110 and the projector 120. For example, the locations of the reference planes PL1 and PL2 may be determined according to the length of the baseline between the camera 110 and the projector 120. In some embodiments, the distance d1 and d2 could be determined according to a search range of the depth decoder 160 and/or the combination of the search range of the depth decoder and the length of the baseline between the camera 110 and the projector 120.

Figure 2:
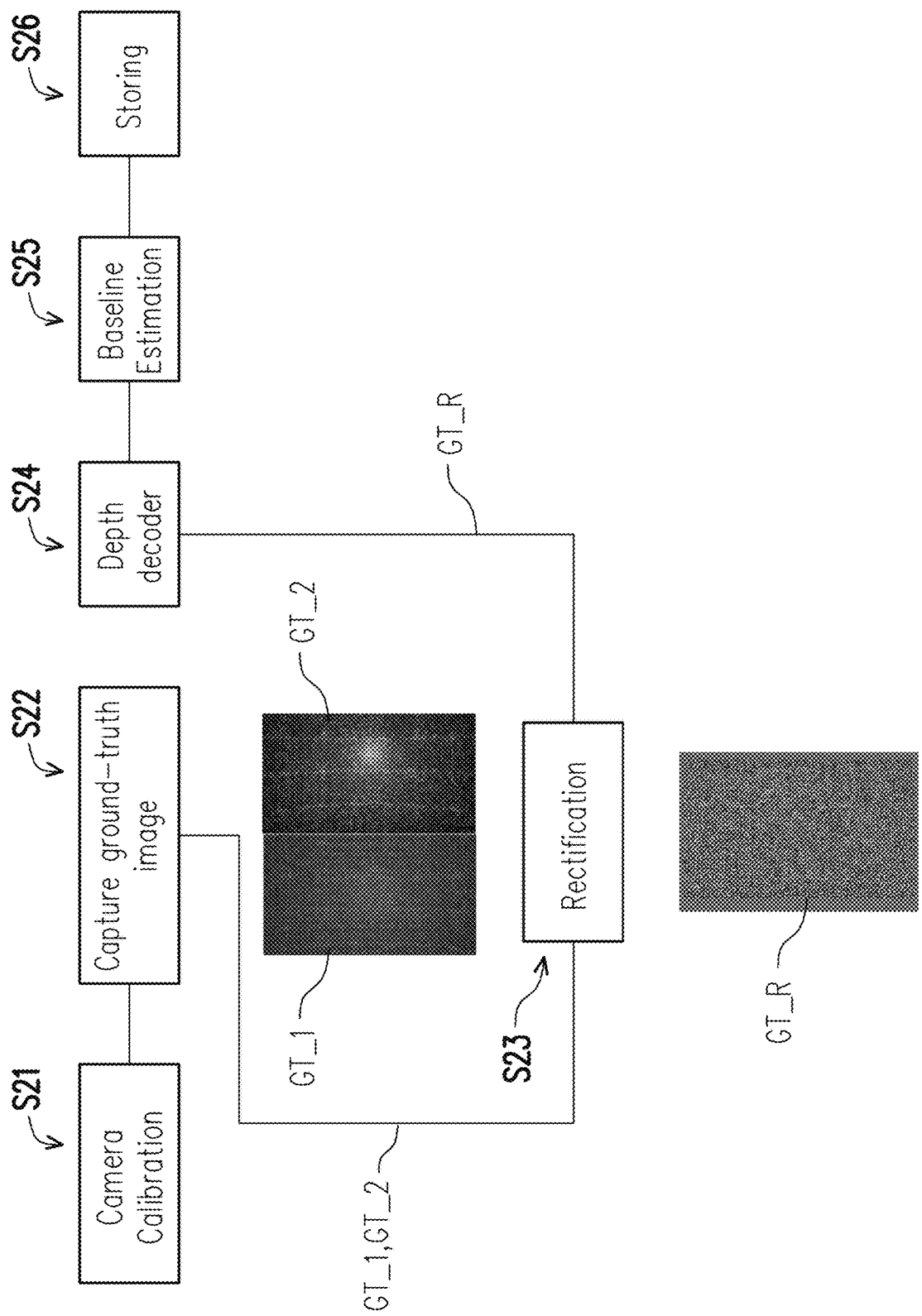
FIG. 2 is a diagram illustrating processing steps for rectifying a ground-truth image in accordance with an embodiment of the disclosure.

Referring to FIG. 2, processing steps for rectifying a ground-truth image in accordance with an embodiment is illustrated. In step S21, a calibration process for the camera (e.g., camera 110 in FIG. 1) is performed to calibrate intrinsic distortions of the camera 110. Once the camera is calibrated, a distortion map may be generated to indicate the distortions of the camera. In step S22, ground-truth images GT_1 and GT_2 are captured from the reference planes in temporal (e.g., reference planes PL1 and PL2 shown in FIG. 1), in which the reference planes are located in different positions. In some embodiments, there are at least two ground-truth images are captured from the reference planes in temporal. In step S23, a rectification process is performed to the captured ground-truth images GT_1 and GT_2 so as to generate the rectified ground-truth image GT_R. In some embodiments, during the rectification process, a merging operation may be performed to merge the ground-truth images GT_1 and GT_2. For example, overlapping regions and non-overlapping regions between the ground-truth images GT_1 and GT_2 may be determined, and the ground-truth images GT_1 and GT_2 are merged to each other according to at least one of determined overlapping regions and determined non-overlapping regions. In some embodiments, a size of the rectified ground-truth image GT_R is different from a size of the ground-truth images GT_1 and GT_2. For example, as a result of the merging operation, the size of the rectified ground-truth image GT_R is greater than the size of the ground-truth images GT_1 and GT_2.

The rectified ground-truth image GT_R and the configurations of the reference planes may be provided to the depth decoder (e.g., depth decoder 160 as shown in FIG. 1) in step S24. In step S25, a baseline between the camera and the projector is estimated according to various parameters. For example, in some embodiments, the baseline between the camera and the projector may be estimated according to equation (1), in which Z is a depth value; f is a focal length of the camera; b is the length of the baseline; $d_{x\_bias}$ is a disparity value; and $d_x$ is a disparity value from a normalized cross correlation (NCC) circuit included in the depth decoder.

$$Z = \frac{f*b}{d_x + d_{x\_bias}} \quad (1)$$

In the equation 1, the focal length f of the camera, the disparity value $d_x$ of the NCC circuit and the depth value Z (e.g., a distance between a reference plane and the depth decoding system) are known from the configurations of the reference planes PL1, PL2 and the two ground-truth images GT_1 and GT_2. As such, the length of the baseline b and the disparity value $d_{x\_bias}$ are obtained by solving the equation (1). In step S26, the distortion map of the camera, the rectified ground-truth image GT_R, disparity value $d_{x\_bias}$ may be stored in a memory and may be used in a depth decoding operation performed by the depth decoder.

Figure 3:
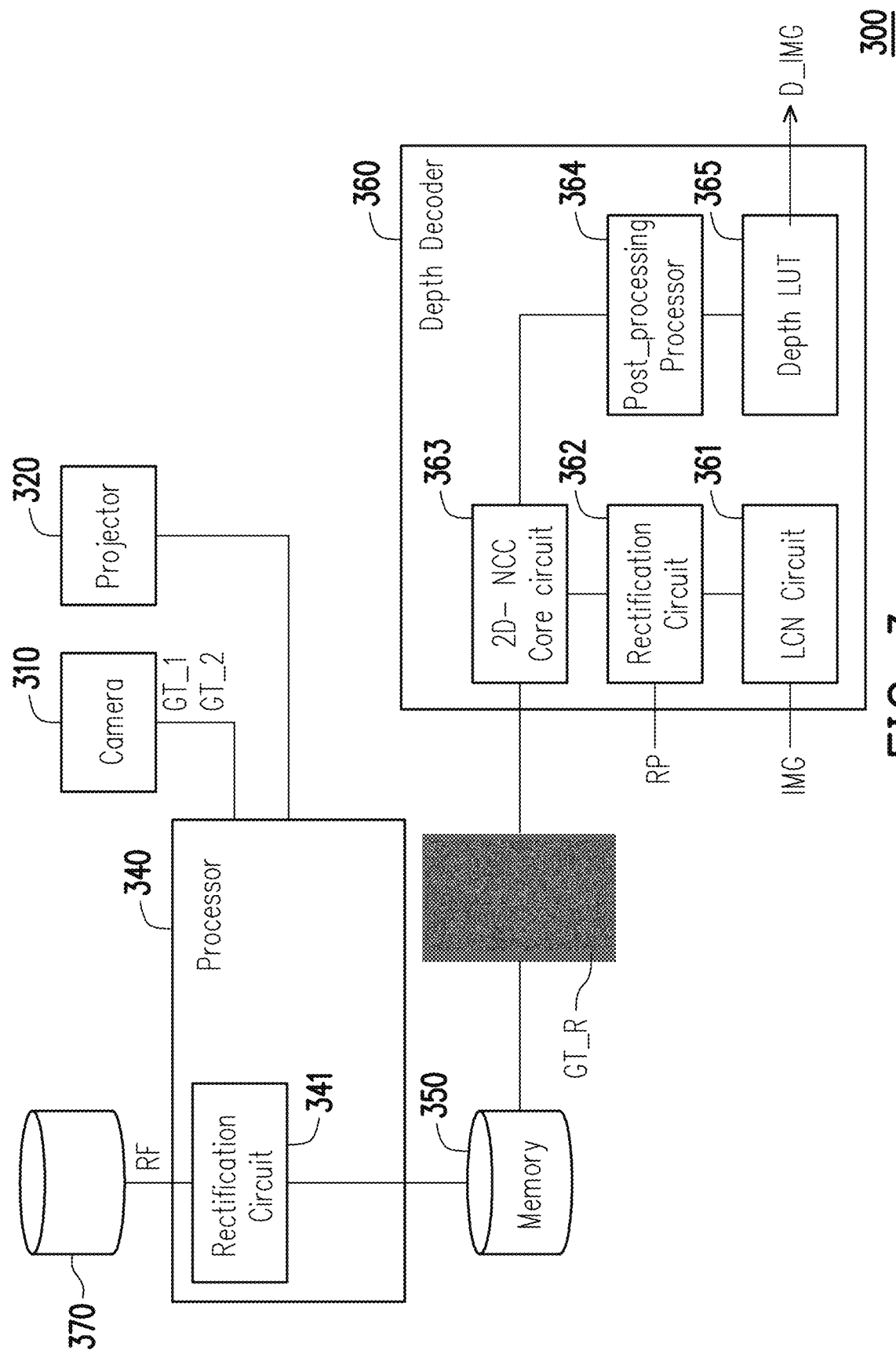
FIG. 3 is a schematic diagram illustrating a depth decoding system in accordance with an embodiment of the disclosure.

Referring to FIG. 3, a depth decoding system 300 in accordance with an embodiment of the disclosure is illustrated. The depth decoding system 300 may include a camera 310, a projector 320, a processor 340, a memory 350, a depth decoder 360 and a memory 370. The camera 310, the projector 320 and the memory 350 are similar to the camera 110, the projector 120 and the memory 150 in FIG. 1, thus the detailed description about the above-mentioned components are omitted hereafter.

The processor 340 is coupled to the camera 310 to receive ground-truth images GT_1 and GT_2 from the camera 310 in temporal. In some embodiments, the processor 340 may include a rectification circuit 314 that is configured to perform a rectification operation to the received ground-truth images GT_1 and GT_2 according to at least one parameters RP to generate the rectified ground-truth image GT_R. The at least one parameter RP may be pre-determined parameters whose values are stored in the memory 370.

The depth decoder 360 may include a local contrast normalization (LCN) circuit 361, a rectification circuit 362, a NCC core circuit 363, a post-processing processor 364 and a depth look-up-table (LUT) 365. The depth decoder 360 may receive an input image IMG and parameters RP, where the input image IMG may be captured by the camera 310 and the parameters RP may be provided by the memory 370. The LCN circuit 361 is configured to perform a contrast normalization operation to the received input image IMG and provide the normalized image to the rectification circuit 362. The rectification circuit 362 may perform a rectification operation to the normalized image provided by the LCN circuit 361 according to the parameters RP. In some embodiments, the parameters RP may include a displacement map that is used to align the normalized image with a rectified ground-truth image GT_R. The NCC core circuit 363 may perform a matching operation between the rectified ground-truth image GT_R and the aligned normalized image to find the disparities between the rectified ground-truth image GT_R and the aligned normalized image. The output of the NCC core circuit 363 may be provided to the post-processing processor 364 for post processing. For example, the post-processing processor 364 may perform the processing operation (e.g., a median filter) to filter noises and improve quality of the output of the NCC core circuit 363. The depth LUT 365 may perform a disparity-to-depth conversion to output a depth result or a depth map D_IMG.

Figure 4:
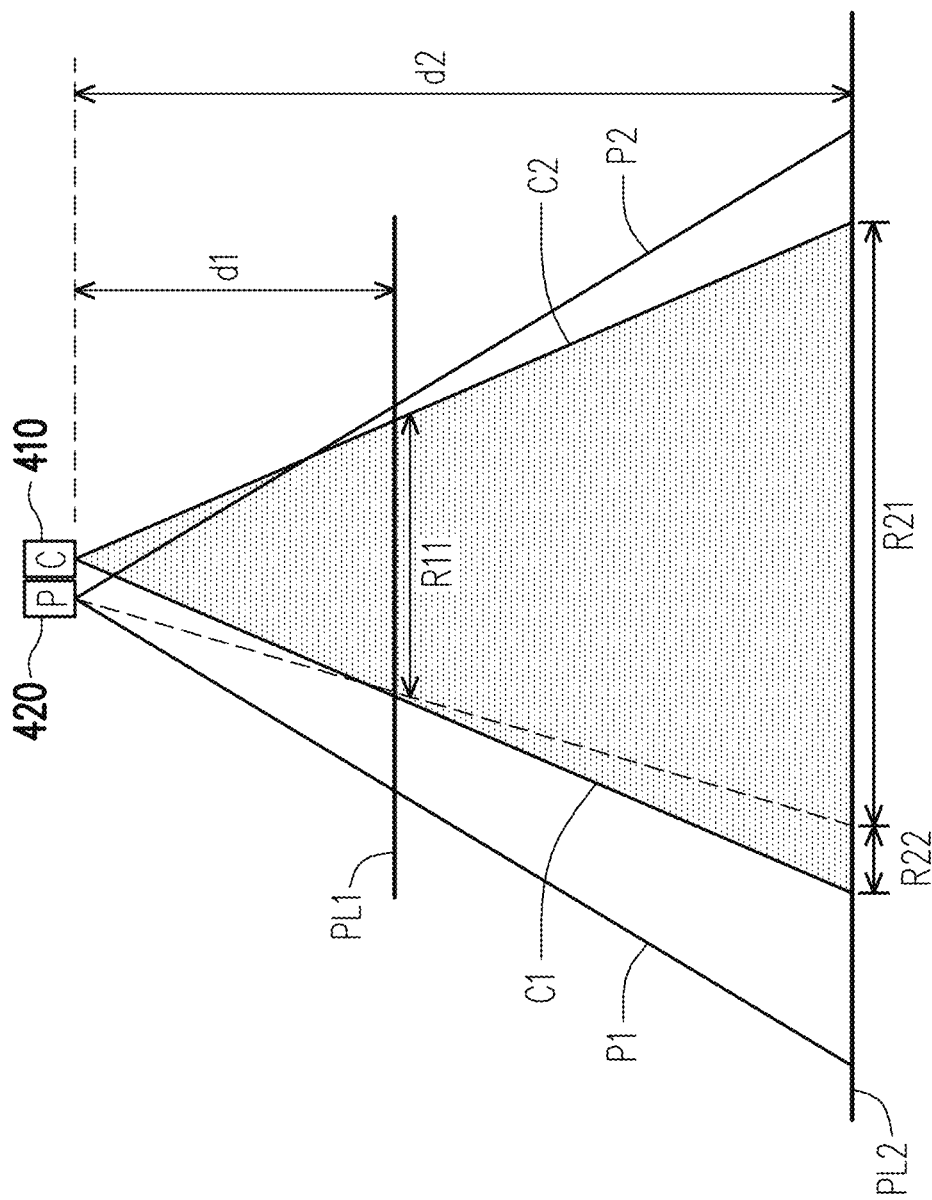
FIG. 4 illustrates an exemplary projectable region of a projector and a viewable region of a camera in accordance with an embodiment of the disclosure.

FIG. 4 illustrates an exemplary projectable region of a projector 420 and a viewable region of a camera 410 in accordance with an embodiment of the disclosure. The camera 410 and the projector 420 are similar to the camera 110 and the projector 120 in FIG. 1, thus the detailed description regarding the above components are omitted hereafter.

Referring to FIG. 4, the projectable region of the projector 420 is determined by boundary lines P1, P2 and the reference planes PL1 and PL2; and the viewable regions of the camera 410 is determined by boundary lines C1, C2 and the reference planes PL1 and PL2. An angle formed by the boundary lines C1 and C1 may be considered as a field of view (FOV) of the camera 410; and the angle formed by the boundary lines P1 and P2 may be considered as the FOV of the projector 420. As shown in FIG. 4, there are overlapping regions and non-overlapping regions between the projectable region of the projector 420 and the viewable region of the camera 410. When the reference plane PL1 is placed to capture a first ground-truth image, the first ground-truth image contains projected content within region R11. When the reference plane PL2 is placed to capture a second ground-truth image, the second ground-truth image contains projected content within regions R21 and R22, where the projected content within the region R21 in the reference plane PL2 is corresponded to the projected content within the region R11 in the reference PL1. The projected content within the region R22 is only appeared when the reference plane PL2 is used. In other words, the projected content within the region R22 is additional content which is captured when the reference plane PL2 and is not captured when the reference plane PL1 is used. In some embodiments, the distance d2 from the reference plane PL2 to the camera 410 and the projector 420 is greater than the distance d1 from the reference plane PL1 to the camera 410 and the projector 420.

In some embodiments, the first ground-truth image captured on the reference plane PL1 and the second ground-truth image captured on the reference plane PL2 are merged and rectified to generate a rectified ground-truth image. As such, the rectified ground-truth image may improve performance of a depth decoding operation in the depth decoding system between the distance d1 and distance d2.

Figure 5:
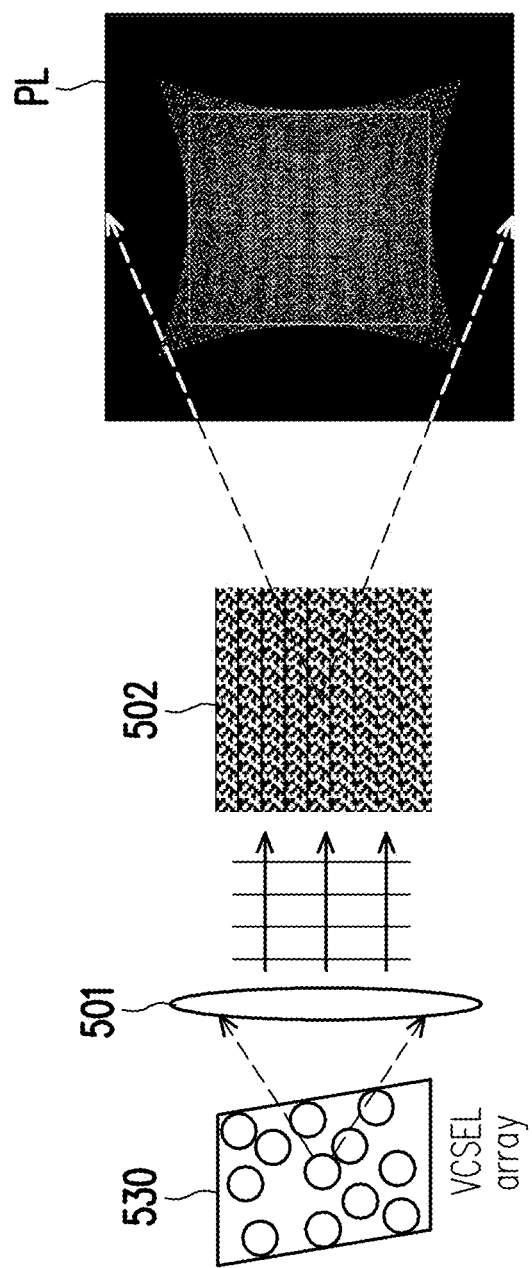
FIG. 5 illustrates exemplary components of a projector for projecting a structural light pattern to a reference plane in accordance with an embodiment of the disclosure.

Referring to FIG. 5, exemplary components of a projector for projecting a structural light pattern to a reference plane PL in accordance with an embodiment is illustrated. The components illustrated in FIG. 5 includes an VCSEL array 530, a lens array or collimating lens 501 and DOE 502, in which the VCSEL array 530 functions as a light source that provide a light beam to the DOE 502 through the lens array or collimating lens 501. In some embodiments, the light beam emitted by the VCSEL array 530 may have a wavelength in near-infrared wavelength range, but the disclosure is not limited thereto. The VCSEL array 530 may emit a light beam in invisible or visible wavelength ranges. The DOE 502 is configured to pattern the light beam outputted from the lens array or collimating lens 501 to generate structural light pattern which is projected to the reference plane PL. The projected content on the reference plane PL may be captured by a camera to generate a ground-truth image.

Figure 6:
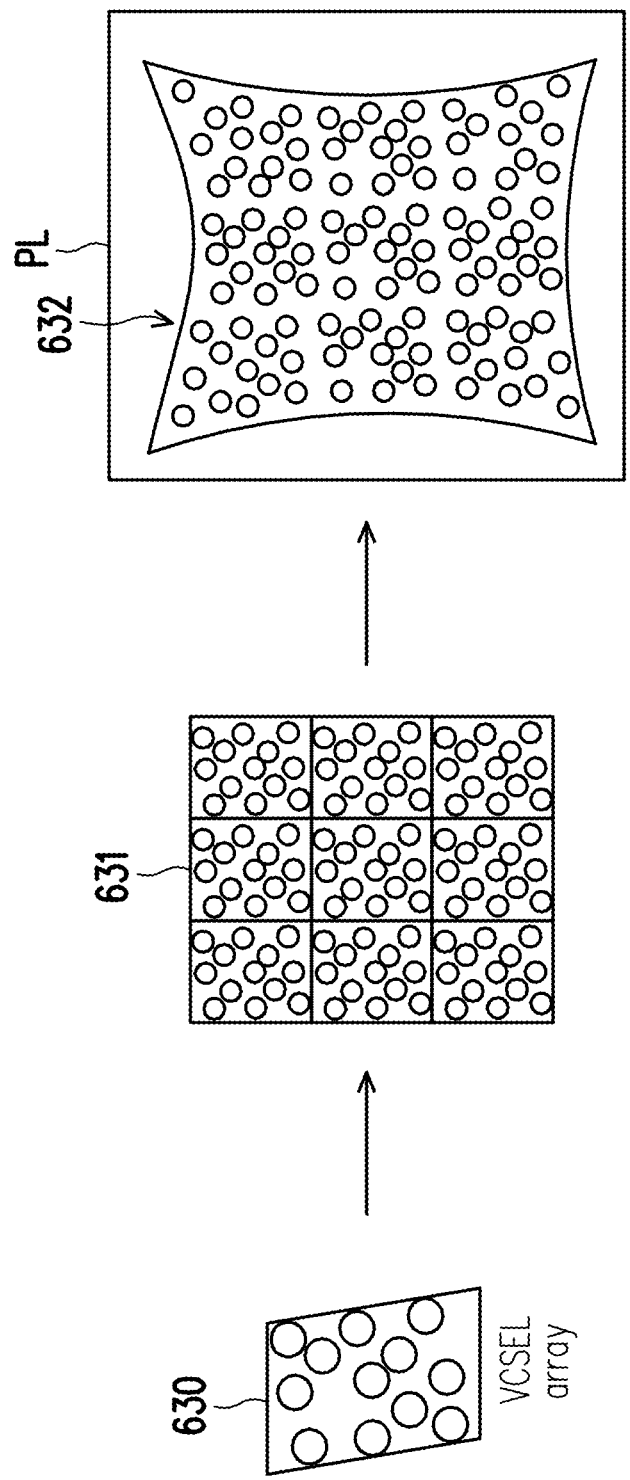
FIG. 6 illustrates an exemplary composite pattern of replicas of a VCSEL array in accordance with an embodiment of the disclosure.

In some embodiments, the VCSEL array may be replicated to produce a plurality of replicas. The replicas of the VCSEL array may be combined to form a composite pattern, and a structural light pattern being projected to the reference plane is generated by the composite of the VCSEL arrays. Referring to FIG. 6, a VCSEL array 630 is replicated to generated replicas of the VCSEL array 630. These replicas of the VCSEL array 630 are combined to generate the composite pattern 631. A number and an arrangement of the replicas of the VCSEL array 630 in the composite pattern 631 are not limited to what is illustrated in FIG. 6.

In some embodiments, the DOE of the projector may be configured to generate the composite pattern 631 from replicas of the VCSEL array 630, where the replicas of the VCSEL array 630 may be overlapped or non-overlapped each other in the composite pattern 631. The DOE may generate a structural light pattern according to the composite pattern 631, and project the structural light pattern to the reference plane PL. The projection of the structural light pattern to the reference plane PL forms a pattern 632 in the reference plane PL. A camera (not shown) may capture the pattern 632 on the reference plane PL to generate a ground-truth image, and rectify captured ground-truth image to generated a rectified ground-truth image.

In some embodiments, the VCSEL array 630 is stored in the memory, and the composite pattern 631 is generated based on the stored VCSEL array 630. In this way, the memory may only need to store the VCSEL array 630 which has smaller size than the composite pattern 631. As a result, the memory storage is utilized more efficiently.

Figure 7:
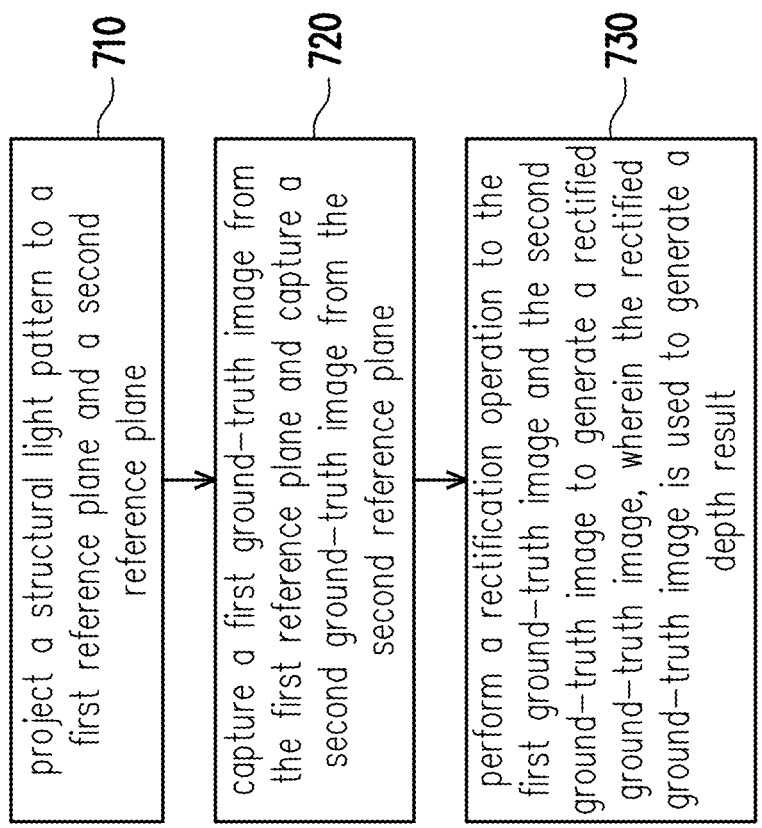
FIG. 7 is a flowchart diagram illustrating a method for rectifying a ground-truth image in accordance with an embodiment of the disclosure.

Referring to FIG. 7, a method for rectifying a ground-truth image in accordance with an embodiment is illustrated. In step S710, a structural light pattern is projected to a first reference plane and a second reference plane. In some embodiments, the structural light pattern may be generated according to a VCSEL array, and the structural light pattern is projected by a projector. In addition, the first and second reference planes may be located in different locations. In step S720, a first ground-truth image is captured from the first reference plane and capture a second ground-truth image is captured from the second reference plane. In step S730, a rectification operation is performed to the first ground-truth image and the second ground-truth image to generate a rectified ground-truth image, wherein the rectified ground-truth image is used to generate a depth result.

From the above embodiments, a depth decoding system projects a structural light pattern is projected to a first reference plane and a second reference plane, captures a first ground-truth image from the first reference plane and capture a second ground-truth image from the second reference plane. The first reference plane and the second reference plane may be located in different locations. The first and second ground-truth images are used in a rectification operation to generate a rectified ground-truth image which is capable of reducing the distortions caused by alignment distortions of components in the depth decoding system. In addition, the depth decoding system may generate a composite pattern that includes replicas of a VCSEL array. In this way, only the VCSEL array is stored in a memory, and the memory storage is utilized more efficiently.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method, comprising:
   projecting a structural light pattern to a first reference plane and a second reference plane;
   capturing a first ground-truth image from the first reference plane and capturing a second ground-truth image from the second reference plane; and
   performing a rectification operation to the first ground-truth image and the second ground-truth image to generate a rectified ground-truth image, wherein the rectified ground-truth image is used to generate a depth result,
   wherein the structural light pattern is projected by a projector; the first ground-truth image and the second ground-truth image are captured by a camera; and a location of the first reference plane and a location of the second reference plane are determined according to a placement relationship between the camera and the projector,
   wherein the location of the first reference plane and the location of the second reference plane are determined according to a baseline between the camera and the projector.

2. The method of claim 1, further comprising:
   generating the structural light pattern according to a tiling pattern, wherein the tiling pattern is a vertical cavity surface emitting laser tiling pattern.

3. The method of claim 1, wherein the structural light pattern is projected to the first reference plane and the second reference plane using diffractive optical elements.

4. The method of claim 1, wherein performing the rectification operation to the first ground-truth image and the second ground-truth image to generate the rectified ground-truth image comprises:
   normalizing the first ground-truth image and the second ground-truth image to generate a first normalized ground-truth image and a second normalized ground-truth image;
   determining an overlapping region between the first normalized ground-truth image and the second normalized ground-truth image; and
   merging the first normalized ground-truth images and second normalized ground-truth images according to the overlapping region to generate the rectified ground truth image.

5. The method of claim 1, wherein a size of the rectified ground truth image is different from a size of the first ground-truth image and a size of the second ground-truth image.

6. A depth decoding system, comprising:
   a projector, configured to project a structural light pattern to a first reference plane and a second reference plane in temporal;
   a camera, configured to capture a first ground-truth image from the first reference plane and capture a second ground-truth image from the second reference plane;
   a processor, configured to perform a rectification operation to the first ground-truth image and the second ground-truth image to generate a rectified ground-truth image; and
   a decoder, configured to generate a depth result according to the rectified ground-truth image,
   wherein a location of the first reference plane and a location of the second reference plane are determined according to a placement relationship between the camera and the projector,
   wherein the location of the first reference plane and the location of the second reference plane are determined according to a baseline between the camera and the projector.

7. The depth decoding system of claim 6, wherein the processor is further configured to generate the structural light pattern according to a tiling pattern, wherein the tiling pattern is a vertical cavity surface emitting laser (VCSEL) tiling pattern.

8. The depth decoding system of claim 6, wherein the projector projects the structural light pattern to the first reference plane and the second reference plane using diffractive optical elements.

9. The depth decoding system of claim 6, wherein the processor is further configured to:
   normalize the first ground-truth image and the second ground-truth image to generate a first normalized ground-truth image and a second normalized ground-truth image;
   determine an overlapping region between the first normalized ground-truth image and the second normalized ground-truth image; and
   merge the first normalized ground-truth images and second normalized ground-truth images to generate the rectified ground truth image.

10. The depth decoding system of claim 6, wherein a size of the rectified ground truth image is different from a size of the first ground-truth image and a size of the second ground-truth image.

11. The depth decoding system of claim 6, further comprising:
   a memory, configured to store the rectified ground-truth image and provide the rectified ground-truth image to the decoder in a decoding operation to generate the depth result.

* * * * *